United States Patent
Mazel et al.

(10) Patent No.: US 10,175,467 B2
(45) Date of Patent: Jan. 8, 2019

(54) AMBIENT LIGHT RESTRICTOR FOR A MICROSCOPE

(71) Applicant: Blueline NDT, LLC, Bedford, MA (US)

(72) Inventors: Charles H. Mazel, Bedford, MA (US); Paula C. Petschek, Bedford, MA (US)

(73) Assignee: BlueLine NDT, LLC, Bedford, MA (US)

( * ) Notice: Subject to any disclaimer, the term of this patent is extended or adjusted under 35 U.S.C. 154(b) by 268 days.

(21) Appl. No.: 14/530,169

(22) Filed: Oct. 31, 2014

(65) Prior Publication Data

US 2015/0124326 A1    May 7, 2015

Related U.S. Application Data

(60) Provisional application No. 61/899,658, filed on Nov. 4, 2013.

(51) Int. Cl.
| | |
|---|---|
| *G02B 21/24* | (2006.01) |
| *G03B 11/04* | (2006.01) |
| *G02B 21/00* | (2006.01) |
| *G02B 21/22* | (2006.01) |
| *G02B 21/16* | (2006.01) |

(52) U.S. Cl.
CPC ......... *G02B 21/24* (2013.01); *G02B 21/0004* (2013.01); *G03B 11/04* (2013.01); *G02B 21/16* (2013.01); *G02B 21/22* (2013.01)

(58) Field of Classification Search
CPC ........................... G02B 21/0004; G02B 21/24; G02B 27/0006; G02B 27/0018; G02B 7/00; G02B 7/20–7/24; G03B 11/04; G03B 11/045–11/06; B65D 85/38
USPC ....... 359/507, 510, 513, 600, 601, 611–612; 396/534; 206/305, 316.1
See application file for complete search history.

(56) References Cited

U.S. PATENT DOCUMENTS

| | | | | |
|---|---|---|---|---|
| 1,433,877 | A * | 10/1922 | Exton | G02B 21/364 33/561.2 |
| 3,393,032 | A * | 7/1968 | Crisler | G01N 21/01 359/513 |
| 4,731,627 | A * | 3/1988 | Chisholm | G03D 17/00 135/87 |
| 5,122,904 | A * | 6/1992 | Fujiwara | A61B 90/36 206/316.1 |

(Continued)

*Primary Examiner* — Kimberly N Kakalec
*Assistant Examiner* — James McGee
(74) *Attorney, Agent, or Firm* — Hamilton, Brook, Smith & Reynolds, P.C.

(57) ABSTRACT

Ambient light can cause a user to experience a loss of contrast of an object or subject under observation by the user via a microscope, particularly when the user is observing the object or subject using fluorescence microscopy. An embodiment of the present invention is an ambient light restrictor for a microscope. The ambient light restrictor defines a port to provide a user with access to oculars of the microscope. The restrictor may be freestanding and provide additional port(s) to enable physical access to the microscope or viewing region. Through use of the restrictor, ambient lights need not be turned off, in cases of indoor use, such as when dozens of microscopes are being used by many scientists in a laboratory, and, in cases of outdoor use, microscopes can be used with little to no loss of contrast of objects or subjects under observation.

23 Claims, 14 Drawing Sheets

(56) References Cited

U.S. PATENT DOCUMENTS

| | | | | |
|---|---|---|---|---|
| 5,532,872 A | * | 7/1996 | Sakamoto | G02B 21/24 359/379 |
| 5,608,574 A | * | 3/1997 | Heinrich | A61B 46/10 359/376 |
| 6,318,864 B1 | * | 11/2001 | Fukaya | G02B 21/0012 359/368 |
| 7,903,327 B2 | * | 3/2011 | Karaki | G02B 21/0004 359/368 |

* cited by examiner

AMBIENT LIGHT RESTRICTOR FOR A MICROSCOPE

RELATED APPLICATION(S)

This application claims the benefit of U.S. Provisional Application No. 61/899,658, filed on Nov. 4, 2013. The entire teachings of the above application are incorporated herein by reference.

BACKGROUND OF THE INVENTION

Microscopes are useful for studying small objects or subjects, such as fruit fly larvae and pupae. In educational and commercial environments, laboratories often have several or dozens of microscopes to enable scientists to perform individual observations.

SUMMARY OF THE INVENTION

Described herein is a device, referred to herein as a 'dark tent,' for microscopes that is easily deployable, versatile, and adaptable to a wide range of existing microscopes. The dark tent can be implemented in any of a number of ways, and described herein are example particular implementations. This description is not intended to preclude other implementations of the basic embodiments. The dark tent includes certain features, such as (1) a material that surrounds the microscope and blocks most, if not all, of any ambient light from reaching the sample stage (or region) where the ambient light would interfere with viewing of the subject; and (2) provision for the microscope oculars (eyepieces) to extend through the material to allow viewing access. These two features at a minimum provide the combination of reduced ambient light in the sample region under the microscope objectives and a means for a user to view objects or subjects in the sample region through the microscope oculars. Another embodiment can cover, at a minimum, just the sample region.

There are other useful features that can be incorporated in certain embodiments in order to provide even greater utility for the user. These other example features include:
 a framework that enables the dark tent to be easily placed around the microscope in a free-standing condition, where the framework may be able to be easily collapsed to allow easy shipping and storage;
 a means to secure the framework members together to hold the framework in this collapsed state;
 a flexible sleeve around the opening for the oculars to allow easy adaptation to microscopes of different sizes and geometries;
 a means (such as elastic, drawstring, or other) for cinching the opening for the oculars around the oculars to minimize light entry;
 a means to open a section of the front of the dark tent to provide easy access to the sample stage for inserting/repositioning/removing/manipulating specimens;
 a means to hold the material that constitutes the cover for the opening referenced above in an open position;
 access slots on either side of the device to allow a user's hands to enter the darkened area inside the device to perform functions, such as manipulating specimens and adjusting the microscope controls, including, but not limited to, focus, zoom, and selection of microscope objectives. The access slots may have additional means for minimizing light entry into the device during use;
 a means to allow passage of an adapter for a camera that a user may wish to use on a trinocular microscope;
 a means (such as elastic, drawstring, or other) for cinching the opening for the camera adapter around the camera adapter to minimize light entry;
 a means to allow passage of other accessory items from the outside to the inside of the device, or vice versa. Accessories can include, but are not limited to, items such as a fluorescence excitation illuminator, micromanipulators, carbon dioxide lines, or any other such item that a user might wish to use in conjunction with the microscope. This means can be implemented in any location around the dark tent as needed to accommodate user requirements;
 a means to create a sealed penetration so that a vacuum-type device can be used to remove fumes and/or particulates from within the enclosed volume created by the device;
 a means such as a flexible hood to cover the user's head while viewing the sample region through the oculars and configured to restrict ambient light from entering the user's field of view; and
 a means for compactly storing the flexible hood on the device, such as by means for a zippered pouch.

An embodiment of the present invention is an ambient light restrictor for microscopes. The ambient light restrictor, also referred to herein as a 'dark tent,' includes a material configured to restrict ambient light from reducing a signal-to-noise ratio of an image of an object observable via a microscope, the microscope having oculars that enable a user to view the object in a sample region. The ambient light restrictor also includes an ocular port defined by the material through which the oculars project to enable the user to access the oculars.

The descriptions above and the accompanying drawings and photographs illustrate an example implementation of the device but are not meant to preclude alternative implementations to achieve the same functions. For example, a customized cover that does not have a framework that enables freestanding operation but does include access to the oculars and other of the described features can be appropriate for application of the device to specific microscopes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 shows: an access for microscope oculars with sleeve; cover for front access to sample stage in closed position; camera adapter access; and flexible framework sewn into the material. In this implementation, the flexible framework is made from two lengths of fiberglass rod.

FIG. 2 is similar to FIG. 1 except that the cover to the front access to the sample stage is shown in the open position, secured by magnets sewn into the fabric attracting a metal rod sewn into the cover. Other security mechanisms such as mating hook-and-loop components, snaps, and hook-and-grommet components can alternatively be employed.

DETAILED DESCRIPTION OF THE INVENTION

Figure 1:
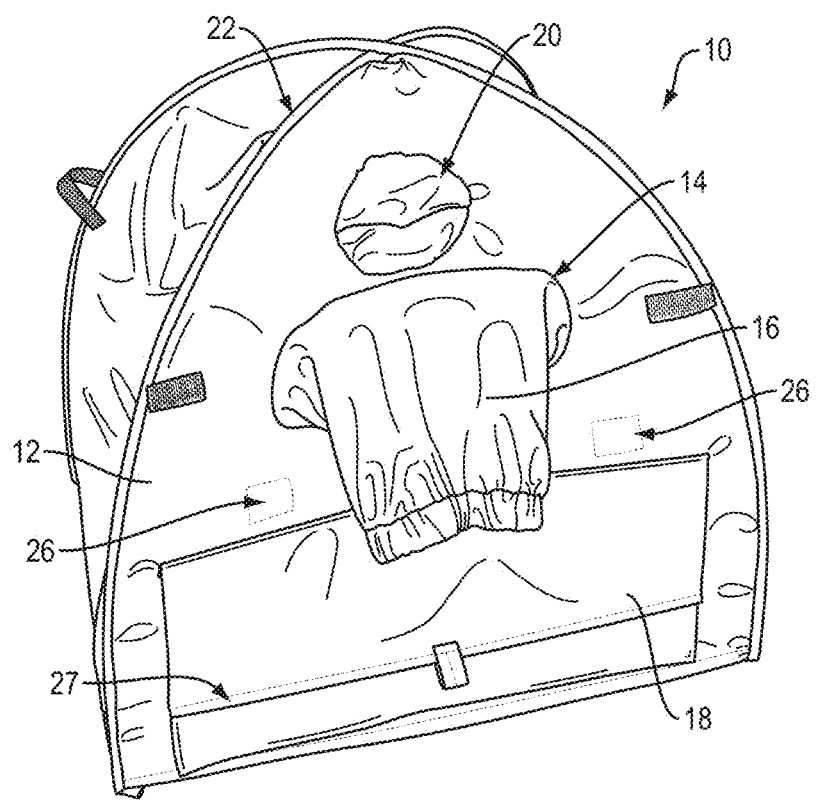
FIG. 1. Perspective view of prototype 'dark tent' device.

A description of example embodiments of the invention follows.

Embodiments of the invention relate to microscopy, and primarily fluorescence microscopy. Due to the relatively low level of light emitted by fluorescence this type of microscopy is typically done in a darkened room, usually one dedicated for such a purpose. For this reason, fluorescence microscopy has generally been relegated to limited numbers of microscopes in locations in which ambient light can be easily controlled without inconveniencing others. There are circumstances, however, in which it would be useful to do fluorescence microscopy in areas that would not normally be darkened, such as student laboratories, non-darkened areas of research and industrial facilities, and even outdoors.

An ability to add a fluorescence imaging capability has been enhanced by the introduction of the Applicant's own commercially available Stereo Microscope Fluorescence Adapter system ("SFA system"). This is leading to application of fluorescence on a wider range of microscopes, with a desire among users to take advantage of existing microscopes located in open (non-darkened) laboratory areas. While Applicant's SFA systems often produce fluorescence brightness that is suitable for use in undarkened areas for many applications, some users turn out the room lights for best effect, thereby inconveniencing other lab users, or erect makeshift light blocking means out of cardboard boxes or other materials.

Furthermore, the small size and low power requirement of Applicant's SFA system open the potential to do fluorescence just about anywhere, including in remote and even outdoor locations. Applicant has personally operated the SFA system in some field situations and needed to surround the microscope with a towel in order to see the fluorescence and to make images.

In addition to Applicant's own SFA systems, fluorescence microscopes from other manufacturers are sometimes deployed in areas where there can be an issue with ambient light. An example is a fluorescence microscope that is used in a student laboratory area, but this may occur in many other instances in academia or industry. The fluorescence microscopes are expensive purpose-built units from other manufacturers, but could benefit from a means to provide an enhanced restriction of ambient light.

Although the embodiments disclosed herein are illustrated in reference to fluorescence microscopy and imaging with stereo microscopes (also called dissection microscopes), it should be understood that embodiments can be used with other microscope variants including compound microscopes. Embodiments may be used with even more light-sensitive equipment in which viewing through oculars is a part of the process. An example is the advanced fluorescence technique of multiphoton microscopy, which is extremely sensitive to any stray light.

The circumstances described above are what led to the recognition of the need for and the motivation for the development of the embodiments of the invention described herein.

An example embodiment of the described invention and photographic examples of the benefit provided by the technology are shown in the accompanying figures.

FIG. 1 shows a perspective view of the prototype 'dark tent' device 10 formed by a material 12. The photograph shows: access 14 for microscope oculars with sleeve 16; cover 18 for front access to sample stage in closed position;

camera adapter access port 20; and flexible framework 22 sewn into the material. In this implementation, the flexible framework 22 is made from two lengths of fiberglass rod. Other materials, physical arrangements, and interconnections may be employed in forming the flexible framework. Magnets 26 are sewn into or otherwise coupled to the material 12. The magnets 26 will attract a metal rod 27 sewn into the front access cover 18 to hold the cover open.

The framework 22 may extend between opposing bottom corners of the material when supporting the material in the freestanding state. In one embodiment the opposing bottom corners are diagonally across from each other, and in other embodiments they may be adjacent corners with additional structure as required. Retention members (not shown), such as clips, clamps, magnets, or other means for retaining a physical relationship between components (e.g., the fiberglass rods), may be employed to maintain the structure of the 'dark tent' device 10. In one embodiment the retention is in the form of sleeves defined by material incorporated in the device such as through sewing or heat fusion means. The same or different retention members may be employed to keep the components together while in a collapsed state.

While the drawings and descriptions herein refer to a 'dark tent' device with a four-sided structure, other embodiments may incorporate other numbers of sides and corners, or even a dome structure. The framework may also be formed by incorporation of channels that may be inflated, and the 'dark tent' may be free-standing or in some way stiffened, whether the 'dark tent' is free standing or not, through use of the inflated channels.

The 'dark tent' may be understood as an ambient light restrictor for microscopes. The 'dark tent' may include a material configured to restrict ambient light from reducing a signal-to-noise ratio of an image of an object observable via a microscope, the microscope having oculars that enable a user to view the object in a sample region. The 'dark tent' may include an ocular port defined by the material through which the oculars project to enable the user to access the oculars.

As used herein, a higher signal-to-noise ratio means that the image is composed of more photons reflecting from or emitted by the object as compared to ambient light within the image. In the case of a standard microscope, a higher signal-to-noise ratio means that very little or no ambient light enters the sample region so as not to reduce contrast, for example, of the image of the object that the user sees through the oculars. In the case of a two-photon microscope, for example, a higher signal-to-noise ratio means that very little or no ambient light is collected by an optical sensor (e.g., charge-coupled device (CCD) array) such that the sensor collects mostly or only photons originating from the area of interest of the subject being viewed.

Figure 13:
FIG. 13. Photograph of fruit fly (*Drosophila melanogaster*) larvae and pupae taken using a Canon Rebel T2i camera mounted to the camera adapter on a stereo microscope trinocular port, with the 'dark tent' device not deployed around the microscope. The flies are genetically modified to express green fluorescent protein (commonly known as GFP) in the cholinergic neurons, but the green fluorescence is overwhelmed by the ambient light.
Figure 14:
FIG. 14. Photograph of fruit fly (*Drosophila melanogaster*) larvae and pupae taken using a Canon Rebel T2i camera mounted to the camera adapter, with the 'dark tent' device deployed around the microscope. The flies are genetically modified to express green fluorescent protein (commonly known as GFP) in the cholinergic neurons. With the 'dark tent' device in place the green fluorescence is easily seen in high contrast.

In view of the foregoing, it should be understood that in some embodiments, the material restricts the ambient light from entering the sample region. In other embodiments, the material restricts the ambient light from being collected by a light detection sensor. FIGS. 13 and 14, described below, are examples of lower signal-to-noise ratio and higher signal-to-noise ratio images, respectively, where the difference in signal-to-noise ratios of the images is achieved through use of an embodiment of the 'dark tent.'

Figure 2:
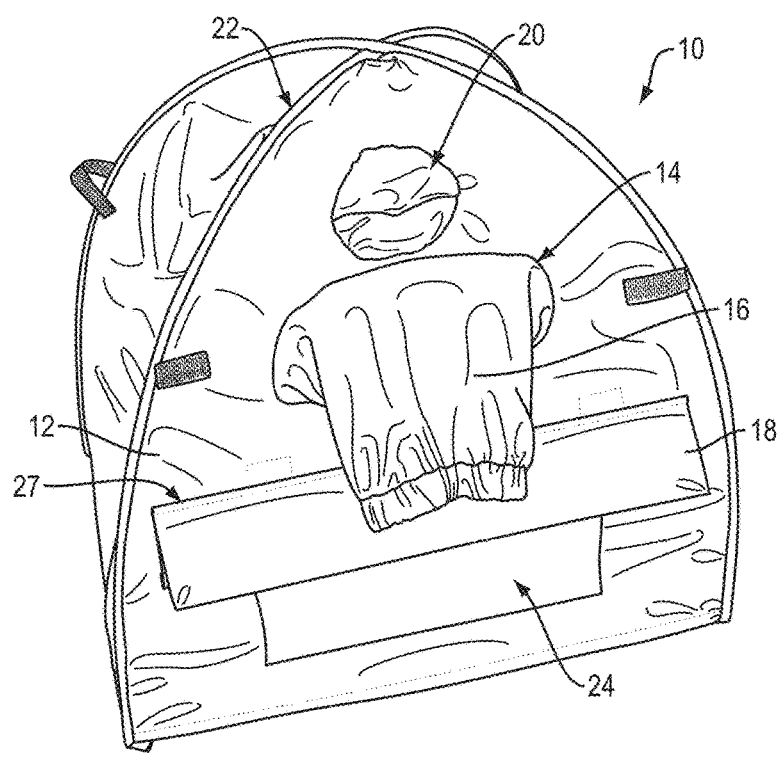
FIG. 2. Perspective view of prototype 'dark tent' device.

FIG. 2 shows a perspective view of the prototype 'dark tent' device. The drawing is similar to FIG. 1 except that the cover 18 to the front access opening 24 to the sample stage is shown in the open position, secured by magnets (not visible) sewn into the fabric attracting the metal rod 27 sewn into the cover 18. Other security mechanisms, such as mating hook-and-loop components, snaps, and hook-and-grommet components, can alternatively be employed.

Figure 3:
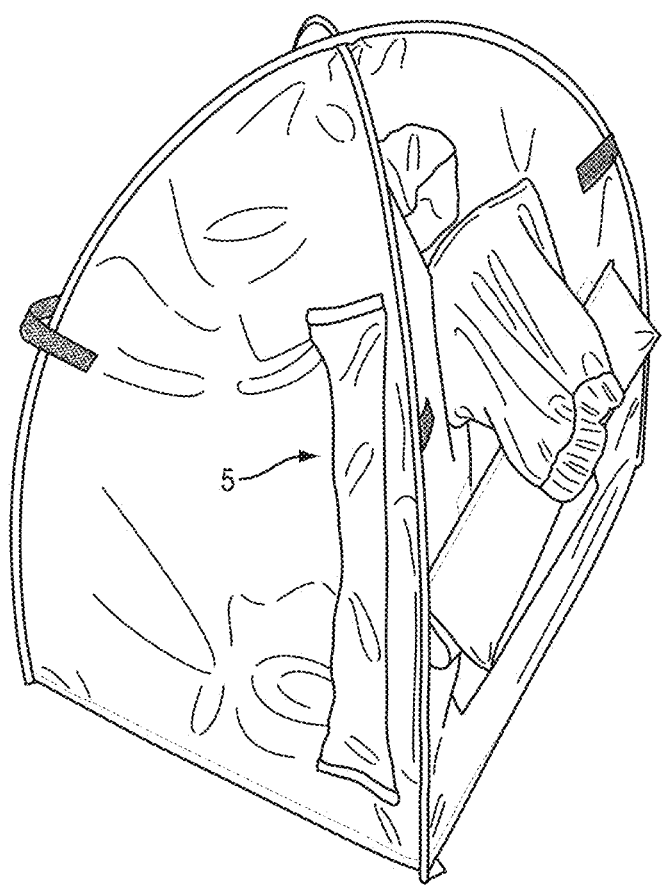
FIG. 3. Perspective view showing side of 'dark tent' device, indicating a lateral access port on the left side of the device. This slot allows a user's hand to enter the darkened area inside the device to perform functions such as manipulating specimens and adjusting the microscope controls, including but not limited to focus, zoom, and selection of microscope objectives. There is a corresponding lateral access port on the opposing face of the device.

FIG. 3 is a perspective view that shows the side of the 'dark tent' device, indicating a lateral access port 5 on the left side of the device. This slot allows a user's hand to enter the darkened area inside the device to perform functions, such as manipulating specimens and adjusting the microscope controls, including but not limited to focus, zoom, and selection of microscope objectives. There is a corresponding lateral access port on the opposing face of the device.

Figure 4:
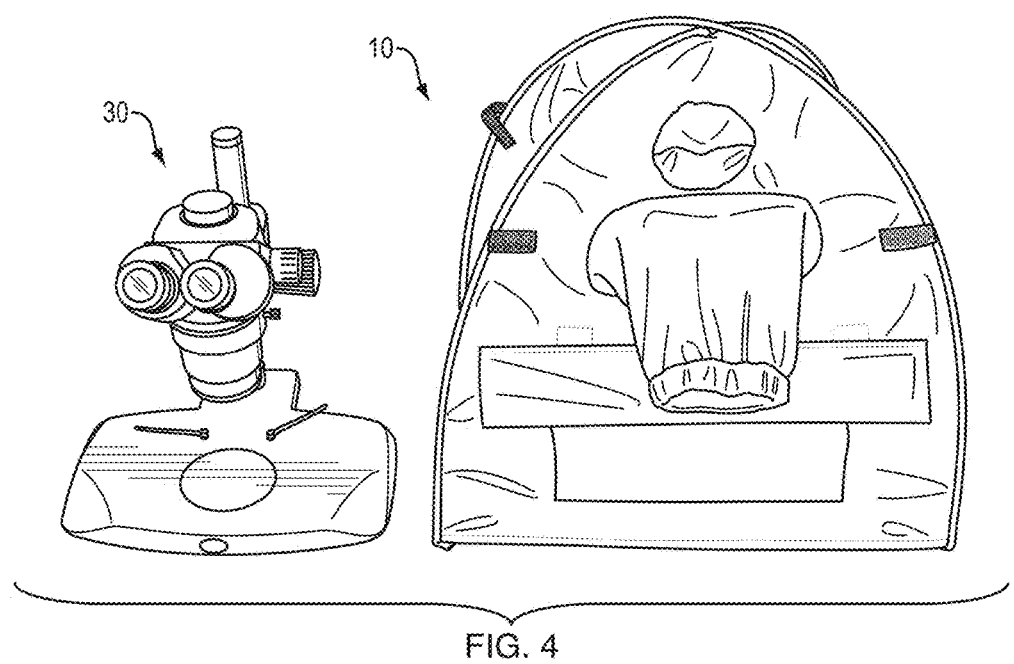
FIG. 4. Front view showing the 'dark tent' device next to a conventional stereo microscope.

FIG. 4 is a front view showing the 'dark tent' device 10 next to a conventional stereo microscope 30.

Figure 5:
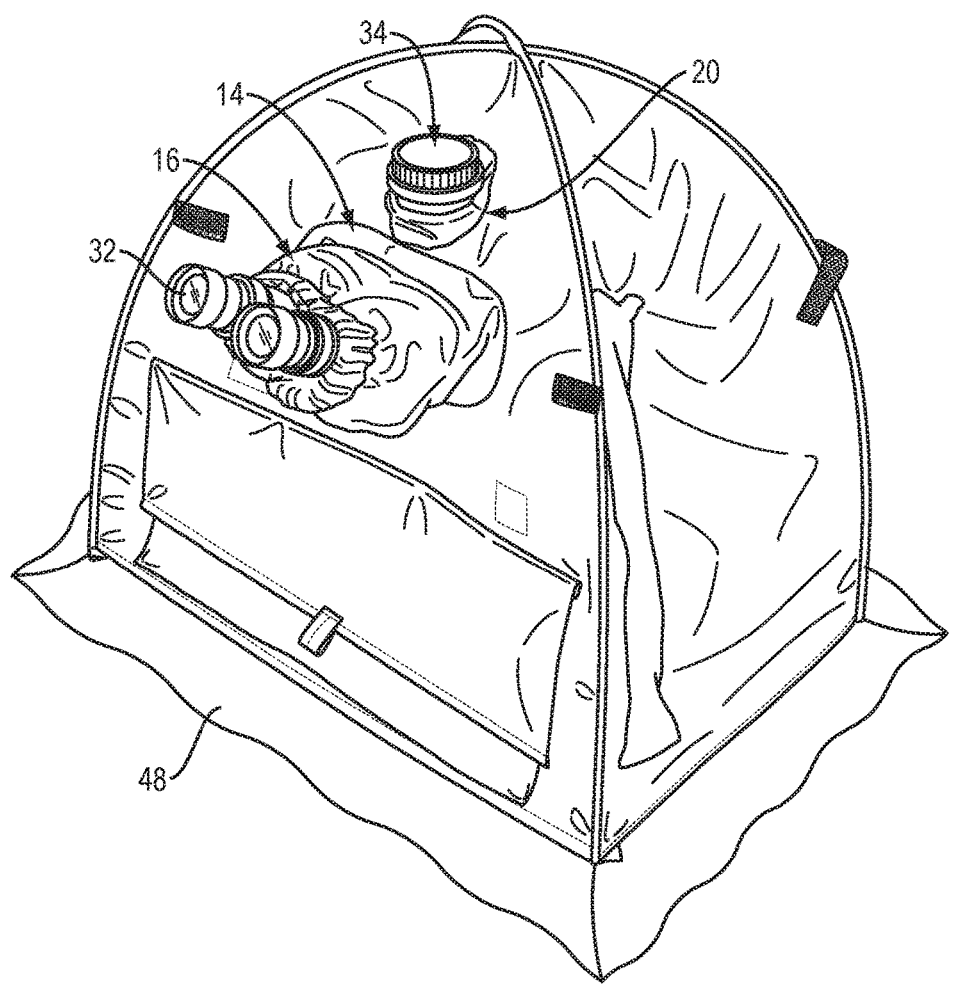
FIG. 5. Perspective view showing the 'dark tent' device deployed around a stereo microscope. The oculars project through the sleeved ocular access port. A camera adapter projects through the camera adapter access port above the oculars.

FIG. 5 is a perspective view showing the 'dark tent' device deployed around a stereo microscope. The microscope oculars 32 project through the sleeved 16 ocular access port 14. A camera adapter 34 projects through the camera adapter access port 20 above the oculars.

Figure 6:
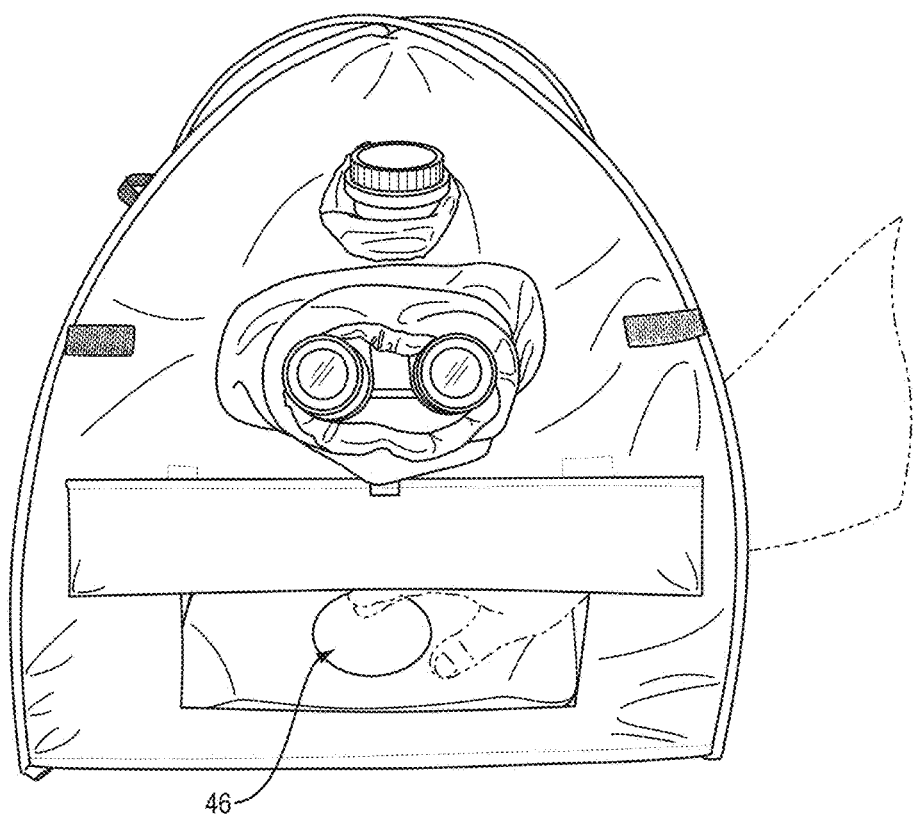
FIG. 6. Front view of 'dark tent' device deployed around a stereo microscope, showing a hand reaching through the right side lateral access port to the sample area.

FIG. 6 is a front view of the 'dark tent' device deployed around a stereo microscope, showing a hand reaching through the right side lateral access port to the sample area 46.

Figure 7:
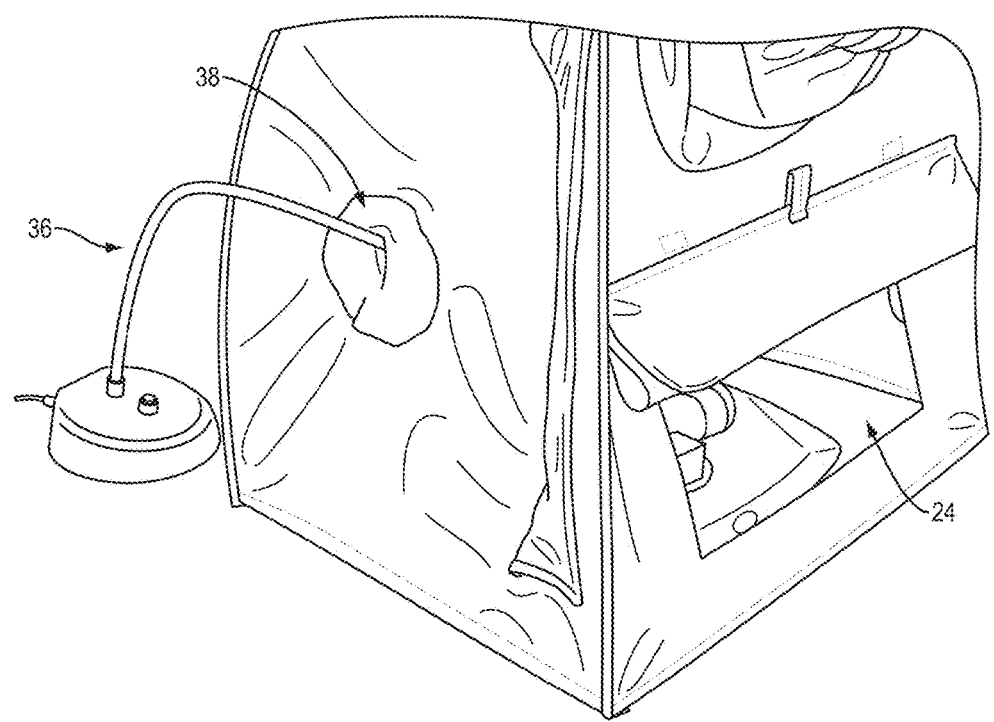
FIG. 7. Perspective view showing an excitation light source penetrating from the outside to the inside of the 'dark tent' device through an accessory port in the side of the device. The illumination from the source can be seen through the opened front access panel.

FIG. 7 is a perspective view showing an excitation light source 36 penetrating from the outside to the inside of the device through an accessory port 38 in the side of the device. The illumination from the source can be seen through the uncovered front access opening 24.

Figure 8:
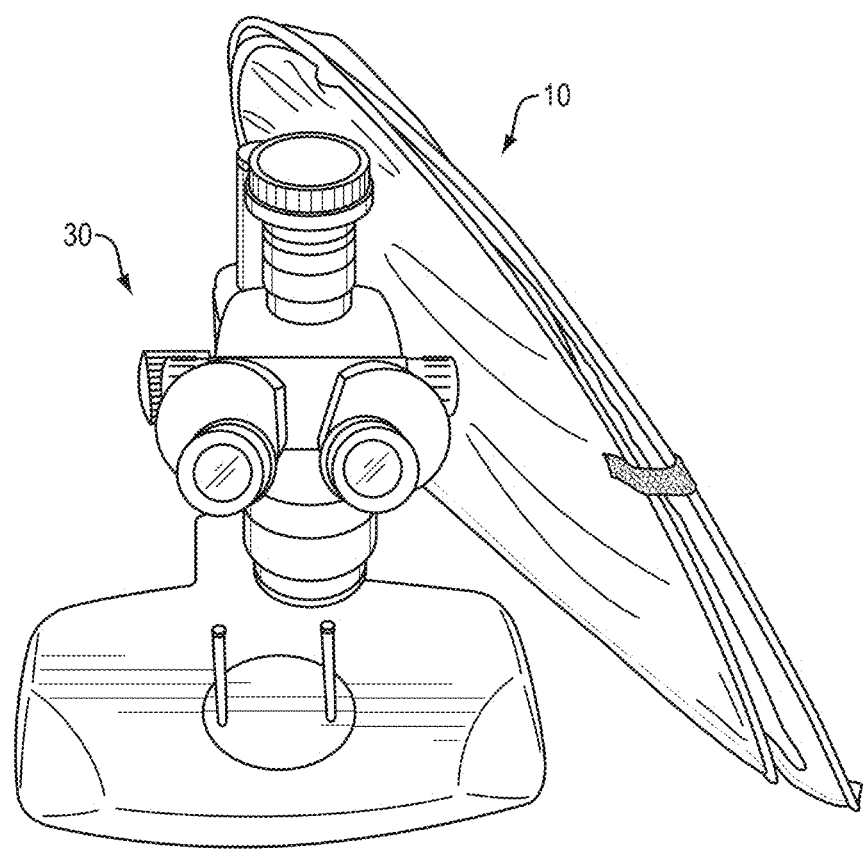
FIG. 8. Photograph of the 'dark tent' device in the collapsed condition leaning against a typical stereo microscope.

FIG. 8 shows the 'dark tent' device 10 in the collapsed condition leaning against a typical stereo microscope 30.

Figure 9:
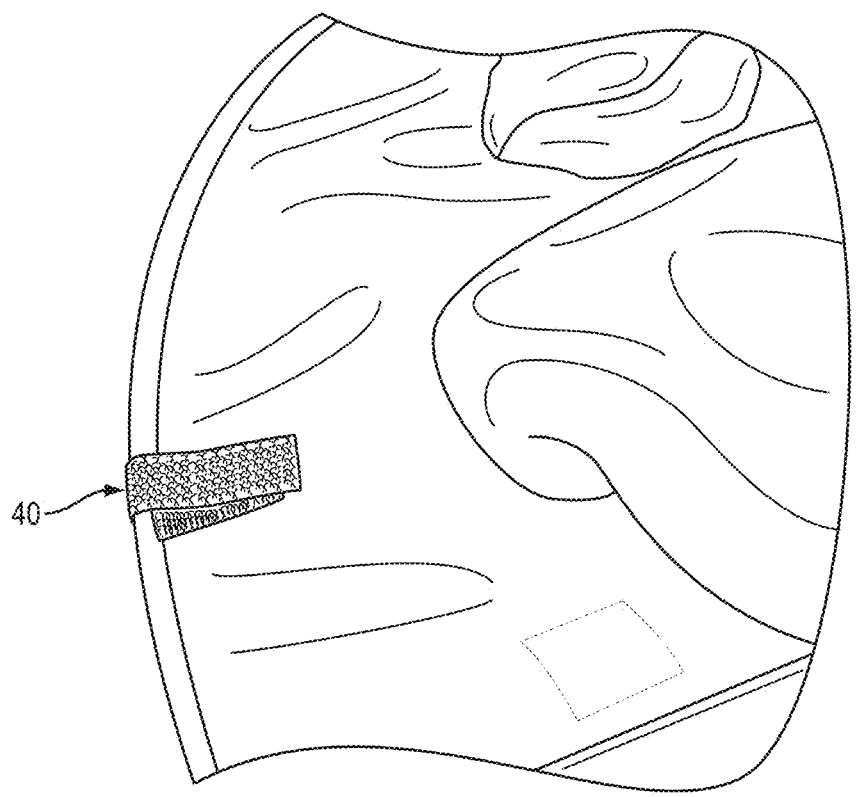
FIG. 9. Detail showing the retention members that secure the collapsed 'dark tent' device framework in the collapsed position. In this implementation, hook-and-loop fasteners are used as the retention members.

FIG. 9 is a detail showing the retention members 40 that secure the collapsed 'dark tent' device framework in the collapsed position. In this implementation, hook and loop fasteners are used as the retention members 40.

Figure 10:
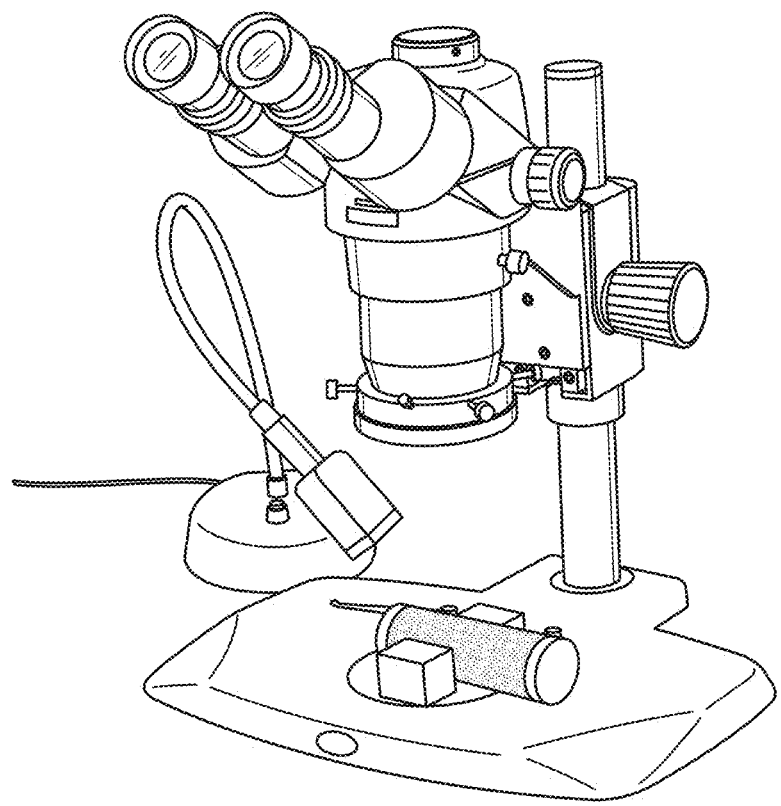
FIG. 10. Stereo microscope set up on a table in a well-lit room, near a window. A fluorescence adapter system including an excitation light source, power supply, barrier filter, and viewing shield is being used with the microscope. A vial containing fruit fly (*Drosophila melanogaster*) larvae and pupae is positioned on the microscope stage. The flies are genetically modified to express green fluorescent protein (commonly known as GFP) in the cholinergic neurons.

FIG. 10 is a view of a stereo microscope set up on a table in a well-lit room, near a window. A fluorescence adapter system including an excitation light source, power supply, barrier filter, and viewing shield is being used with the microscope. A vial containing fruit fly (*Drosophila melanogaster*) larvae and pupae is positioned on the microscope stage. The flies are genetically modified to express green fluorescent protein (commonly known as GFP) in the cholinergic neurons.

Figure 11:
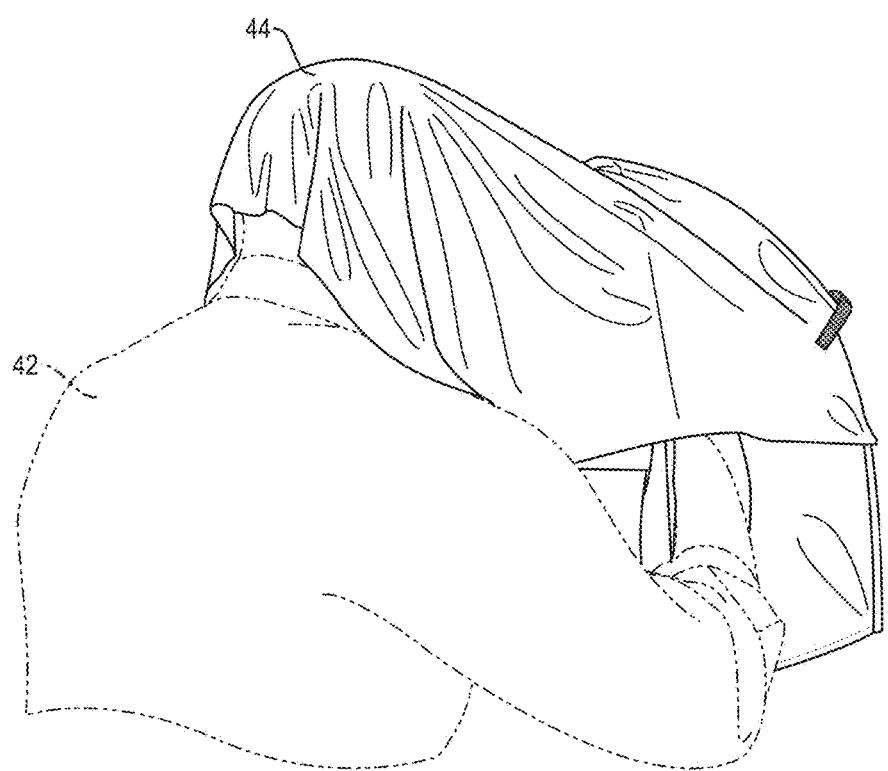
FIG. 11. The same system as in FIG. 10, but with the 'dark tent' device deployed around the microscope and fluorescence adapter. A user is viewing the sample area through the oculars, using the flexible hood to cover his head to limit the ambient light entering via peripheral vision and interfering with viewing contrast.

FIG. 11 illustrates the same system as in FIG. 10, but with the 'dark tent' device deployed around the microscope and fluorescence adapter. A user 42 is viewing the sample area through the oculars, using the flexible hood 44 to cover his head to limit the ambient light entering via peripheral vision and interfering with viewing contrast.

Figure 12:
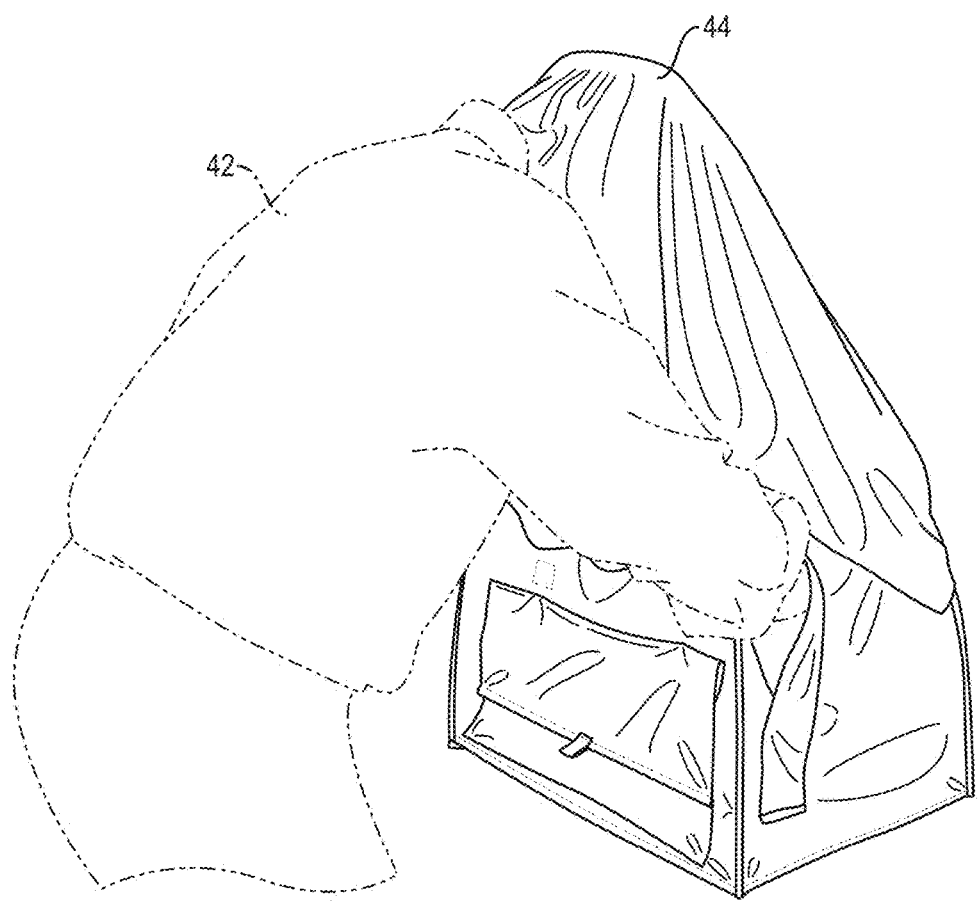
FIG. 12. The system as in FIG. 11, but in this case the user is employing the flexible hood while viewing the display on the back of a camera mounted to the microscope's trinocular port.

FIG. 12 is a photograph of the same system as in FIG. 11, but in this case the user 42 is employing the flexible hood 44 while viewing the display on the back of a camera mounted to the microscope's trinocular port.

FIG. 13 is a photograph of fruit fly (*Drosophila melanogaster*) larvae and pupae taken using a Canon Rebel T2i camera mounted to the camera adapter on a stereo microscope trinocular port with the 'dark tent' device not deployed around the microscope. The flies are genetically modified to express green fluorescent protein (commonly known as GFP) in the cholinergic neurons, but the green fluorescence is overwhelmed by the ambient light.

FIG. 14 is a photograph of fruit fly (*Drosophila melanogaster*) larvae and pupae taken using a Canon Rebel T2i camera mounted to the camera adapter on a stereo microscope trinocular port with the 'dark tent' device deployed around the microscope. The flies are genetically modified to express green fluorescent protein (commonly known as GFP) in the cholinergic neurons. With the 'dark tent' device in place, the green fluorescence is easily seen in high contrast.

While this invention has been particularly shown and described with references to example embodiments thereof, it will be understood by those skilled in the art that various changes in form and details may be made therein without departing from the scope of the invention encompassed by the appended claims.

Concerning the means by which entry of accessory items into the tent is enabled, holes may be cut into the material, with flexible material (not shown) added for light blocking. In some embodiments, users may be supplied with pieces of hook-and-loop (not shown), such as a loop-type material with a square shape having an adhesive back and a hook-type of same size with fabric back. The user uses the adhesive to attach the square where desired on the tent surface then uses a razor knife or equivalent to cut pie-type wedges. The wedges fold inward when anything is inserted through the corresponding port and also serve to block light. When not in use, the fabric-backed material covers this penetration.

The hood provides for a solution for eliminating light entering from the sides of the user's eyes. This peripheral light becomes the limiting factor when using the microscope in high-light situations. High-sided eye shields may alternatively be employed by a user and provided with the dark tent in the form of a kit. High-sided eye shields do not necessarily obviate the option for a user to use a hood, and certain eye shields do not solve the user's challenge of looking at a display on the back of a camera.

In some embodiments a skirt 48 (FIG. 5) of flexible or stiff material may be integrated into or attached to the dark tent device in a manner that provides for even greater sealing against ambient light leak. A flexible material skirt may, for example, simply drape onto and laterally across an area of a surface around a perimeter of the dark tent. In the case of a stiff material skirt, the skirt may include a soft material, such as rubber or dark silicon, that self molds to a topography of the surface of the dark tent. The flexible and stiff material skirts around a perimeter may be adjustably coupled to the dark tent to enable improved connection to the surface area surrounding the perimeter of the dark tent. For example, a screw-type or other adjustable fastener may be employed with the solid material embodiment to enable the dark tent to be partially or fully supported by the skirt, thereby applying weight to the skirt to cause its interface with the surface beneath it to be even more ambient light restricting. The flexible and stiff materials may be any materials, such as natural or man-made materials, including cotton, wool, aluminum, or fiberglass.

It should be understood that the 'dark tent' device may include additional accessory ports (not shown) to enable passage of other accessories, such as camera(s), light source(s), electrical line(s), gas (e.g., $CO_2$) line(s), and so forth. It should be understood that access and other ports disclosed herein are for example only. Other combinations and shapes may be employed in other example embodiments.

What is claimed is:

1. An ambient light restrictor for microscopes, comprising:
  a material configured to restrict ambient light from reaching a sample region and reducing a signal-to-noise ratio of an image of an object at the sample region observable via a microscope, the microscope having oculars that enable a user to view the object in the sample region;
  a structure comprising a framework configured to enable the material to be freestanding at the microscope; and
  an ocular port defined by the material through which the oculars project to enable the user to access the oculars.

2. The ambient light restrictor of claim 1 wherein the ocular port has attached thereto an ocular port sleeve configured to extend along the oculars toward the user.

3. The ambient light restrictor of claim 2 wherein the ocular port sleeve is configured to allow flexibility in adapting to microscopes of different geometries, and to allow for vertical motion of the oculars.

4. The ambient light restrictor of claim 1 wherein the configured to enable the ambient light restrictor to be in a collapsed state.

5. The ambient light restrictor of claim 1 wherein the structure is a framework comprises a pair of flexible members coupled to the material, wherein the flexible members extend between opposing bottom corners of the material when supporting the material in the freestanding state.

6. The ambient light restrictor of claim 5 further comprising retention members to secure the pair of flexible members to each other when in a collapsed state.

7. The ambient light restrictor of claim 1 further comprising lateral access ports on lateral sides of the material with respect to the microscope to enable the user to have physical access to the sample region from lateral directions.

8. The ambient light restrictor of claim 1 further comprising a frontal access port located in the material beneath the ocular port to enable the user to access the sample region from a frontal direction.

9. The ambient light restrictor of claim 1 further comprising a camera adaptor port configured to enable an adaptor for a camera to pass through the material.

10. The ambient light restrictor of claim 1 further comprising a hood extendable from the material to cover a head of the user while viewing the sample region through the oculars and configured to restrict ambient light from entering the user's field of view.

11. The ambient light restrictor of claim 1 further comprising an accessory port to enable an accessory to project through the material.

12. The ambient light restrictor of claim 11 wherein the accessory is a fluorescence excitation light source.

13. The ambient light restrictor of claim 1 wherein the material is flexible.

14. The ambient light restrictor according to claim 1 further comprising a skirt arranged to interface with a surface on which or above which the material is positioned.

15. The ambient light restrictor according to claim 14 wherein the skirt is a flexible material skirt.

16. The ambient light restrictor according to claim 14 wherein the skirt is a stiff material skirt.

17. The ambient light restrictor according to claim 14 wherein the skirt defines a bottom edge and includes a self-molding material coupled to its bottom edge to provide for a matching fit between the skirt and surface on which the bottom edge resides.

18. The ambient light restrictor of claim 14 further comprising an adjustable fastener coupling the material and the skirt and being configurable to enable the skirt to be raised and lowered relative to the material.

19. The ambient light restrictor of claim 1 wherein the material restricts the ambient light from being collected by a light detection sensor.

20. The ambient light restrictor of claim 1 wherein the structure framework is a flexible framework.

21. The ambient light restrictor of claim 20 wherein the flexible framework is collapsible.

22. The ambient light restrictor of claim 1 wherein the structure and the material define a bottom edge of the ambient light restrictor that interfaces with a surface on which the bottom edge resides.

23. The ambient light restrictor of claim 22 wherein a side of the structure defined by the bottom edge is open to the surface.

\* \* \* \* \*

UNITED STATES PATENT AND TRADEMARK OFFICE
CERTIFICATE OF CORRECTION

PATENT NO. : 10,175,467 B2
APPLICATION NO. : 14/530169
DATED : January 8, 2019
INVENTOR(S) : Charles H. Mazel and Paula C. Petschek Page 1 of 1

It is certified that error appears in the above-identified patent and that said Letters Patent is hereby corrected as shown below:

In the Claims

In Claim 4, Column 8, Line 12, delete "wherein the" and insert -- wherein the structure is --.

In Claim 5, Column 8, Line 16, delete "structure is a framework" and insert -- framework --.

In Claim 20, Column 8, Line 67, delete "structure framework" and insert -- framework --.

Signed and Sealed this
Seventh Day of July, 2020

Andrei Iancu
*Director of the United States Patent and Trademark Office*